United States Patent

[11] 3,575,422

[72] Inventors John Robert Peltz
Warren;
Clayton Lewis Stoldt, North Warren;
Nikolaus Adalbert Szeverenyi, Warren, Pa.
[21] Appl. No. 803,201
[22] Filed Feb. 28, 1969
[45] Patented Apr. 20, 1971
[73] Assignee Sylvania Electric Products, Inc.
Continuation-in-part of application Ser. No. 643,683, June 5, 1967, now abandoned.

[54] DRIVE SYSTEM
3 Claims, 5 Drawing Figs.
[52] U.S. Cl. ................................................ 274/4
[51] Int. Cl. ................................................ G11b 5/56
[50] Field of Search ................................ 74/84, 436, 415, 112; 274/4, 11, 1; 179/100.2 (CA)

[56] References Cited
UNITED STATES PATENTS
2,390,862 12/1945 Alexandersson et al. ...... 274/1
2,576,125 11/1951 Lapish ...................... 274/10
3,010,724 11/1961 Hansen ..................... 274/10
3,130,975 4/1964 Proctor ..................... 274/4
3,437,762 4/1969 Lear et al. .................. 274/4(A)
3,450,409 6/1969 Pitzer ....................... 274/4(A)

Primary Examiner—Harry N. Haroian
Attorneys—Norman J. O'Malley, Donald R. Castle and William H. McNeill ABSTRACT: A tape cartridge player having automatic channel-changing and shutoff capabilities. The player motor drives a flywheel which is attached by a shaft to the drive capstan of the player. At the appropriate times, intermittent drive mechanisms engage the rotating shaft which couples to the intermittent drive mechanisms energy from the rotating flywheel, which energy is utilized to provide the drive motion to accomplish the aforementioned auxiliary functions. The slight damping or slowing of the flywheel and the drive capstan during these intermittent operations does not affect the system performance since the operations occur at a time when no signal is being taken from the tape.

Patented April 20, 1971

INVENTORS
JOHN R. PELTZ,
CLAYTON L. STOLDT, &
NIKOLAUS A. SZEVERENYI

BY Donald R. Castle
ATTORNEY

Patented April 20, 1971
3,575,422
2 Sheets-Sheet 2
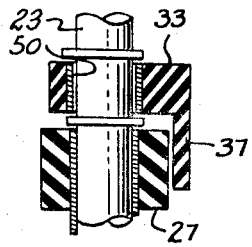
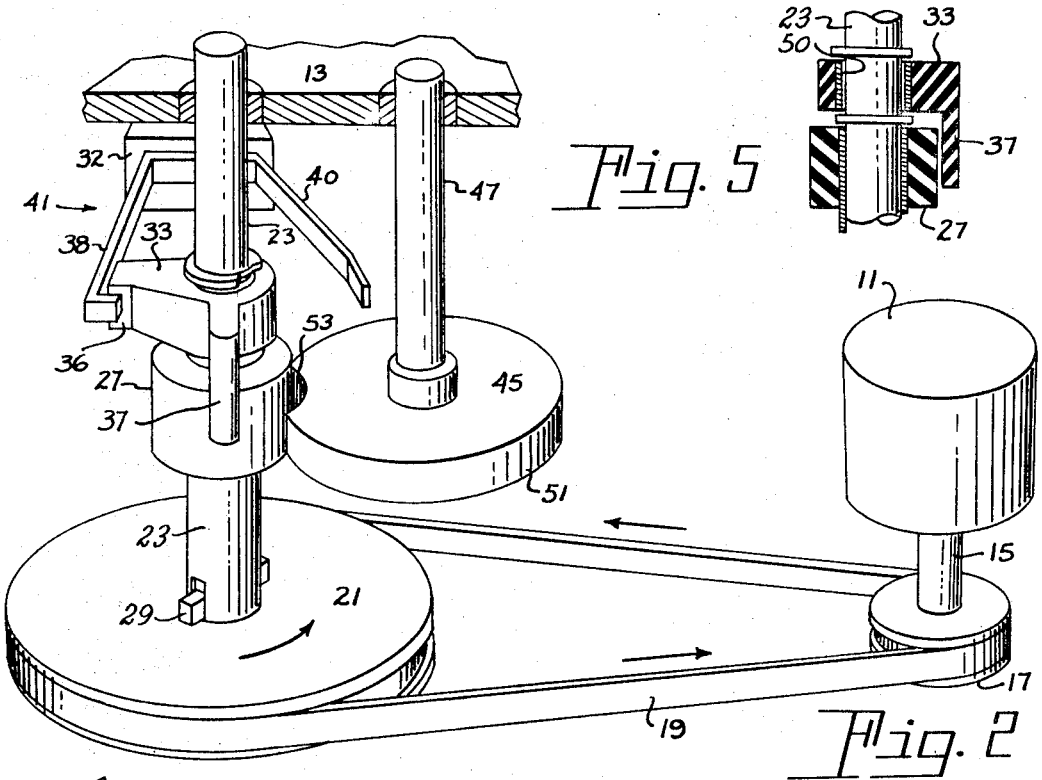
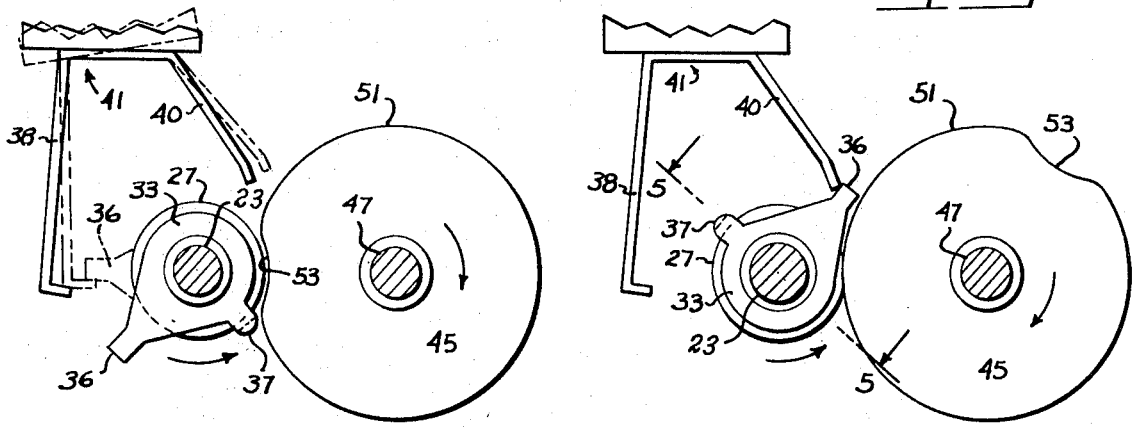
INVENTORS
JOHN R. PELTZ,
CLAYTON L. STOLDT, &
NIKOLAUS A. SZEVERENYI
BY Donald R. Castle
ATTORNEY

DRIVE SYSTEM

CROSS-REFERENCE TO RELATED APPLICATION

This application is a continuation-in-part of Ser. No. 643,683, filed June 5, 1967 entitled "Drive System" and now abandoned. An example of a drive tip mechanism which could be utilized with the present invention is shown and described in copending patent application Ser. No. 643,465 entitled "Intermittent Drive Mechanism" filed concurrently with the above-cited application and assigned to the assignee of the present application and now U.S. Pat. No. 3,446,086.

BACKGROUND OF THE INVENTION

This invention relates generally to drive systems and more particularly to an improved drive system capable of providing sustained drive motion and intermittent drive motion from a single source of driving energy.

There are numerous systems known in the art which require both sustained drive motion and intermittent drive motion. For example, record players and multichannel endless loop tape cartridge players require sustained drive motion to turn the turntable and to rotate the drive capstan, respectively. They also require intermittent drive motions to accomplish auxiliary functions such as to change records or to change from one tape channel to another. In some instances such systems utilize multiple sources of energy to accomplish the different functions. For example, some tape cartridge systems utilize a constant speed motor to rotate the drive capstan and a solenoid-driven ratchet or cam to effect channel changing. Other systems may utilize clutch or gear systems to switch the energy from a drive motor to the intermittently driven system.

Generally, these prior drive systems have met with one or more disadvantages. For example, the solenoid-actuated intermittent drive mechanisms require a considerable amount of electrical power to drive the solenoid. This may require a separate power source and in addition the resultant electrical surge is difficult to filter and appears as a loud noise in the audio system. In addition such solenoids are physically large and have limited ranges of performance. The mechanical clutch and gear systems in addition to being relatively noisy are often complex and are comparatively expensive.

Accordingly it is an object of the present invention to provide an improved multifunction drive system which overcomes the foregoing difficulties of prior art systems.

Another object of this invention is to provide an improved multifunction drive system which utilizes a single source of drive energy.

Still another object of this invention is to provide an improved multifunction drive system of economical design which has minimal power requirements.

Yet another object of this invention is to provide an improved multifunction drive system which is relatively smooth and quiet in operation, having a long operating life and enhanced reliability.

SUMMARY OF THE INVENTION

According to one aspect of the present invention, a continuously rotating flywheel of substantial mass is connected by means of a drive shaft to the drive capstan of a tape cartridge player which operates to move the tape past the tape sensor at a constant speed. The intermittent drive mechanisms are disposed adjacent to the drive shaft and at the appropriate times each mechanism is placed in positive engagement with the drive shaft so that the kinetic energy of the flywheel is coupled through the shaft to the respective intermittently driven member to provide the drive force to accomplish the selected auxiliary function. Because of the mass of the flywheel, the source driving the flywheel sees only a relatively small load increase during the intermittent drive

DESCRIPTION OF THE DRAWINGS

FIG. 2 is a partial perspective view of the intermittent drive system of FIG. 1;

FIGS. 3 and 4 are sequential plan views of the intermittent drive mechanism of FIG. 2 during a cycle of operation; and FIG. 5 is a sectional view of the driving tip and driving hub taken along line 5—5 of FIG. 4.

DESCRIPTION OF THE PREFERRED EMBODIMENT

Figure 1:
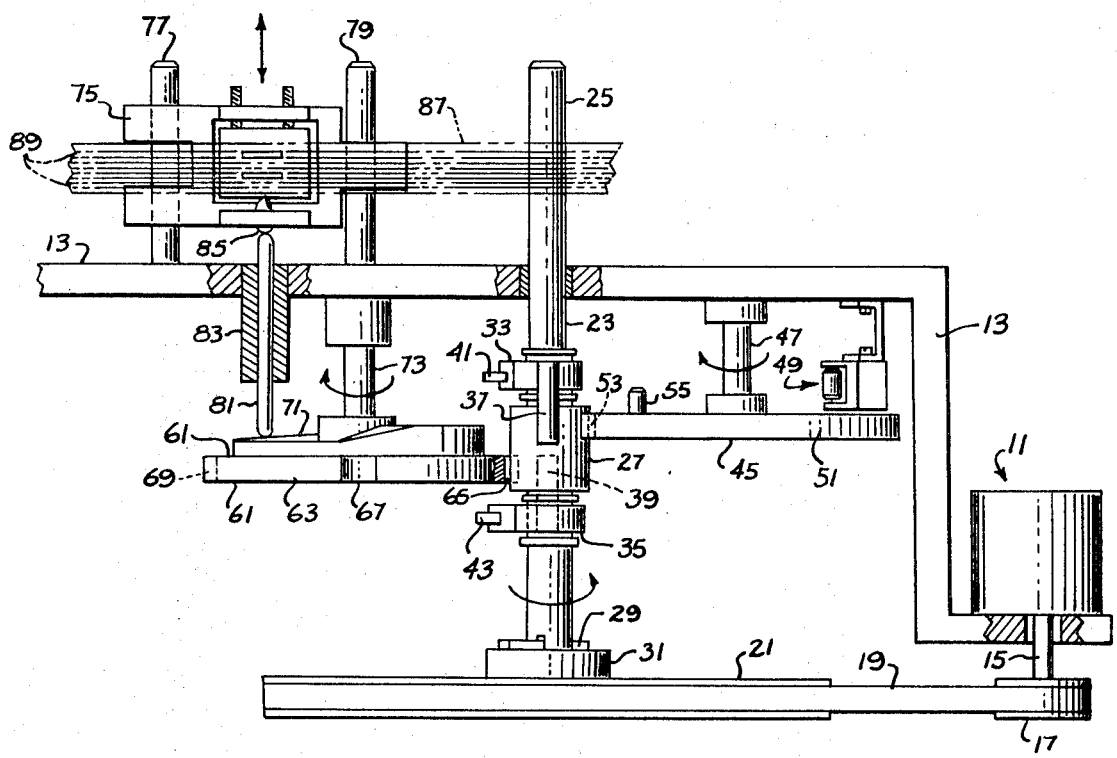
FIG. 1 is a partial perspective view of a tape cartridge player incorporating the present invention.

For a better understanding of the present invention, together with other and further objects, advantages and capabilities thereof, reference is made to the following disclosure and appended claims in connection with the above-described drawings.

Referring now to FIG. 1, the drive system of the present invention will be described as applied to a multichannel endless loop tape cartridge player, but it is to be understood that the invention may be used in any application requiring a multidrive capability. The system, as shown includes a motor 11 mounted on the player housing 13 with the motor shaft 15 extending through the housing. A pulley 17 is attached to the end on the motor shaft and a drive belt 19 provides linkage between the pulley and a flywheel 21. A drive shaft 23 is attached to the flywheel and extends upward through the housing 13. The upper part 25 of the drive shaft functions as the drive capstan of the tape player. A driving hub 27 fits over the drive shaft and is supported in position by a bushing 29 keyed to a mounting plate 31 on the flywheel. Mounted loosely and concentrically on the drive shaft are two drive tips 33 and 35, one drive tip 33 being mounted above the driving hub and the other drive tip 35 mounted below the driving hub. Each of the drive tips has a protuberance (37 and 39, respectively) extending out from the drive shaft and running parallel to the driving hub. Suitable escapement members 41 and 43 operate to hold the drive tips 33 and 35, respectively, in a stationary position.

Disposed adjacent the drive shaft 23 is a rotatable cam 45 which has a shaft 47 suitable secured to the player housing 13. The cam has a driving surface 51 including a detent 53, the cam being positioned so that the driving surface is normally in contact with the driving hub 27, except when the detent 53 is adjacent to the driving hub. Mounted on the cam is an actuation tip 55. A switch 49 is mounted to the player housing positioned relative to the cam 45 and the actuation tip 55 mounted on the cam.

Also disposed adjacent the driving hub 27 is a second rotatable cam 61, which has a driving surface 63 including a number of detents 65, 67 and 69. The upper portion of the cam includes a cammed surface 71 having a plurality of positions, one corresponding to each of the detents in the driving surface 63. The cam 61 is secured to the player housing 13 by means of a free-mounted rotatable shaft 73.

Mounted on the housing 13 and positioned relative to the cam 61 is a magnetic head assembly 75. The magnetic head assembly is positioned between two posts 77 and 79, which permit motion of the head but only in the vertical direction. A follower arm 81 is fitted in a journal 83 secured to the player housing such that one end of the follower arm rests on the cammed surface 71 of the rotatable cam 61 and the other end of the follower arm makes contact with a positioning pin 85 on the magnetic head assembly 75. The magnetic tape 87 having a plurality of recording tracks 89 is driven between the drive capstan 25 and a drive roller (not shown) so that the tape passes the magnetic head assembly 75 with the selected tracks in proper alignment with the record gaps of the magnetic head.

In operation the drive system of the invention functions in the following manner. Upon activation of the motor 11, rotational energy is translated through the motor shaft 15 to the pulley 17, which couples this energy through the drive belt 19 to the flywheel 21. After the initial startup period, the flywheel and the drive shaft 23 including the drive capstan portion 25 rotate at a constant angular speed, the capstan providing the force to move the tape 87 past the magnetic head assembly 75 to permit readout of the information stored on the tape. In order to change channels, it is necessary to change the position of the head relative to the tape. This is accomplished by suitably releasing the drive tip 35 from the escapement member 43 so that the protuberance 39 of the drive tip is rotated into the detent 65 on the driving surface 63 of the cam 61. As the drive tip enters the detent, it initiates physical contact between the cam and the driving hub, causing the cam to begin rotating. As the drive tip passes from the detent, the driving surface 63 of the cam is brought into direct contact with the driving hub, thereby continuing to impart rotational motion to the cam, which continues until the next detent on the driving surface is brought adjacent to the driving hub, at which point the contact between the hub and the cam is broken. As the cam rotates from the position where the detent 65 is adjacent to the hub to the point where the next detent is adjacent to the hub, the cammed surface 71 provides a vertical motion to the follower arm 81 which moves the magnetic head assembly in position for the next channel of the tape. A more detailed description of a particular drive tip, intermittent drive actuator may be found in the aforementioned copending application.

The operation of the cam 45 is similar to the operation of the cam 61. As the drive tip 33 is released from the hold of the escapement member 41, the protuberance 37 rotates into the detent 53 thereby imparting rotational motion to the cam 45 and bringing the driving surface 51 of the cam into direct contact with the driving hub 27. The rotation of the cam continues through a full 360° until the detent 53 is again adjacent to the driving hub at which point contact between the hub and the driving surface is broken. As the cam rotates, the actuation tip 55 wipes across the switch 49 to provide a desired function, which may be, for example, an automatic shutoff of the tape player at the end of the last channel.

Referring next to FIGS. 2—5, to provide a better understanding of the present invention therein will be described the coaction between the flywheel 21, driving hub 27, an intermittently driven member 45 and the above-described intermittent drive mechanism. For ease of understanding only one intermittently driven member 45 having a single detent 53 will be considered. In FIG. 2, there is shown a drive system including a motor 11 having a shaft 15 attached to a pulley 17. A drive belt 19 is connected between the motor pulley 17 and a second pulley 21. The drive shaft 23 is affixed to the pulley 21 and extends through the mounting surface 13 of the system incorporating the drive mechanism. Mounted on and secured to the drive shaft 23 is a driving hub 27, and mounted loosely above the driving hub on the drive shaft is a driving tip 33. The driving tip has two protuberances 36 and 37 extending therefrom. The second protuberance 37 extends outward and down parallel to the axis of the drive shaft 23 and driving hub 27. An escapement member 41 including a movable plate 32 has attached thereto first and second arms 38, 40 which extend outward to be disposed on opposite side of the driving tip 33. The first arm 38 of the escapement member is formed as shown to provide positive engagement with the first protuberance 36 of the driving tip.

Disposed adjacent to the drive shaft 23 proximate the driving hub 27 is the member 45 to be intermittently driven. This driven member is secured to a shaft 47 which extends upward through the mounting surface 13. The device (not shown) to be intermittently driven may be suitably attached to the upper portion of the shaft 47. The driven member 45 includes a driving surface 51 with a portion of the member formed to provide a detent 53 in the driving surface. As illustrated in FIG. 2, the detent 53 is disposed adjacent the driving hub 27 so there is no contact between the hub and the driving surface of the driven member. Also, the escapement member 41 is positioned such that the first arm 38 thereof is in positive engagement with the driving tip 33. Therefore, even though the drive shaft is rotating as indicated by the direction of the arrows, the driving tip is held stationary by the arm 38 of the escapement member 41.

Referring next to FIG. 3, to initiate the intermittent driving motion of the driven member 45, the escapement member is moved from the first holding position as indicated by the shadowed lines to a second position as illustrated, where the first protuberance 36 of the driving tip 33 is released from the restraint of the arm 38. The movement of the escapement member may be accomplished in any of a number of ways depending upon particular design considerations or preferences. For example, the escapement member could be controlled by a relay-activated mechanism or could be manually operated. The coupling between the drive shaft 23 and the driving tip 33 causes the driving tip to rotate with the shaft, rotating the protuberance 37 of the driving tip into the detent 53 in the driving surface 51 of the driven member 45. As the protuberance 37 of the driving tip enters the detent 53, since the protuberance 37 as illustrated is at least as wide as the opening between the driven member 45 and the driving hub 27, the protuberance provides a direct coupling between the driven member 45 and the driving hub 27 and a wedging action occurs to provide a coupling between the driving hub 27 and the driven member 45, thereby initiating rotational motion of the driven member in a clockwise direction as illustrated.

As the driving tip passes out of the detent 53, the driving hub 27 comes into intimate contact with the driving surface 51 of the driven member 45 as illustrated in FIG. 4. This contact continues the rotational motion of the driven member 45 until the detent 53 once again becomes adjacent the driving hub 27 as shown in FIG. 3, thereby breaking the contact between the hub and the driving surface 51 of the driven member 45.

The following action precludes the possibility of initiating more than one drive cycle each time the escapement is moved from the first hold position to the second activate position. When the escapement member moves to the second position, as shown in FIG. 4, the second arm 40 of the escapement member is moved into position to block the first protuberance 36 of the driving tip 33. The blocking action is maintained until the escapement member 41 is returned to the first hold position as illustrated in FIG. 2 when the driving tip rotates until the protuberance 36 comes into contact with the holding arm 38. Therefore, only one cycle of intermittent drive motion can occur each time the escapement member is moved from the first hold position to the second position and back to the first position.

The sectional view of FIG. 5 illustrates the relative spacing between the protuberance 37 of the driving tip 33 when the driving tip is held stationary by the arm 38 of the escapement member 41. As shown there is a small gap between the protuberance 37 and hub 27 to avoid functional contact therebetween in the hold position. Also, the drawing of FIG. 5 is somewhat exaggerated to show a spacing 50 representing the aforementioned loose coupling between the drive shaft 29 and the driving tip 33. Because of this loose coupling, a minimal force is required to hold the driving tip stationary and also a minimal force is required to actuate the escapement member to effect the release of the driving tip and initiation of the intermittent drive cycle.

In the foregoing description it can be seen that energy to provide the switching action, such as the channel changing, is taken from the flywheel 21. That is, the rotational momentum of the rotating flywheel can provide relatively large amounts of energy for the short periods of time required for the switching operations. While it is true that the flywheel and the drive capstan 25 slow down momentarily when the cam-switching action occurs because of the increased load, this does not affect the high fidelity reproduction, since information is not taken from the tape during the time the switching occurs. The amount of energy available from the flywheel is largely dependent upon the mass of the flywheel.

By way of example, it has been found that a flywheel weighing approximately 800 grams is capable of providing the intermittent functions of channel changing, automatic cartridge lock-in, automatic cartridge release and automatic shutoff in a tape cartridge player.

It will be readily apparent that the means for providing engagement between the intermittently driven cam and the drive shaft attached to the flywheel may be accomplished in many different ways. Also, while the invention has been illustrated by showing how two different functions of a tape cartridge can be accomplished, one can appreciate that any number of intermittent operations may be similarly performed depending on system requirements by suitably adding one or more cams to the system. As previously mentioned, the drive system of the invention is not to be construed as limited in application to tape cartridge players, but may be used in any system requiring both sustained drive means and intermittent drive means.

It is therefore apparent that applicants have provided an improved drive mechanism which is capable of providing sustained and intermittent driving motion from a single source of drive energy. By eliminating relatively high power consumption devices such as solenoid and utilizing the energy stored in the flywheel, the system has minimal power requirements, lower cost and smoother performance with enhanced reliability.

While there has been shown and described what is at present considered the preferred embodiment of the invention, it will be obvious to those skilled in the art that various changes and modifications may be made therein without departing from the scope of the invention as defined by the appended claims.

We claim:

1. In an endless loop multichannel tape cartridge player including a magnetic head and a drive capstan operative to move the tape past said magnetic head wherein said magnetic head occupies a different position relative to the tape for each channel, an improved drive system operative to continuously rotate said drive capstan and intermittently move said magnetic head from one channel position to another, comprising:
   a drive motor;
   a flywheel;
   a drive shaft having one end attached to said flywheel with the opposite end of said drive shaft mounted in said player and adapted to operate as the drive capstan;
   means coupling said drive motor to said flywheel whereby the energy from said drive motor provides rotational motion of the flywheel, shaft and drive capstan;
   a rotatable cam positioned adjacent said drive shaft;
   means connecting said rotatable cam to said magnetic head; and
   means for selectively bringing the rotatable cam into contact with said drive shaft whereby said cam is rotated and imparts motion to move said magnetic head from one channel position to another.

2. The invention according to claim 1 wherein said rotatable cam includes a driving surface substantially parallel to said shaft and a cammed surface normal to said driving surface, said cammed surface indexed to correspond to the various channel positions of said magnetic head.

3. The invention according to claim 2 wherein said means connecting said rotatable cam to said magnetic head comprises a cam follower positioned between the cammed surface of said cam and said magnetic head.